(12) United States Patent
Amine et al.

(10) Patent No.: US 6,858,345 B2
(45) Date of Patent: Feb. 22, 2005

(54) WOUND BIPOLAR LITHIUM POLYMER BATTERIES

(75) Inventors: Khalil Amine, Downers Grove, IL (US); Paul A. Nelson, Wheaton, IL (US)

(73) Assignee: The University of Chicago, Chicago, IL (US)

( * ) Notice: Subject to any disclaimer, the term of this patent is extended or adjusted under 35 U.S.C. 154(b) by 70 days.

(21) Appl. No.: 10/118,788

(22) Filed: Apr. 9, 2002

(65) Prior Publication Data

US 2003/0190520 A1 Oct. 9, 2003

(51) Int. Cl.[7] .............................................. H01M 6/42
(52) U.S. Cl. ...................... 429/149; 429/152; 429/153; 429/161
(58) Field of Search ............................. 429/149, 152, 429/153, 161

(56) References Cited

U.S. PATENT DOCUMENTS 5,219,673 A * 6/1993 Kaun ........................... 429/32
6,139,987 A * 10/2000 Koo et al. ................... 429/210

* cited by examiner

*Primary Examiner*—Dah-Wei Yuan
(74) *Attorney, Agent, or Firm*—Joan Pennington

(57) ABSTRACT

A high power bipolar battery, such as a high power lithium polymer battery is provided. The bipolar battery includes a plurality of multiple cell assemblies. The plurality of multiple cell assemblies is connected in series to form the high power bipolar battery. Each of the plurality of multiple cell assemblies includes a rigid core with a bipolar cell stack of multiple cells wound together around the rigid core to produce a large active cell area. The wound bipolar cell stack includes a positive battery connection and a negative battery connection. A container surrounds the bipolar cell stack. A positive terminal carried by the container is connected to the positive battery connection. A negative terminal carried by the container is spaced apart from the positive terminal and connected to the negative battery connection. A state-of-charge connector carried by the container is spaced apart from the positive and negative terminals. The state-of-charge connector include multiple conductors, each connected to a respective one of the multiple cells.

12 Claims, 5 Drawing Sheets

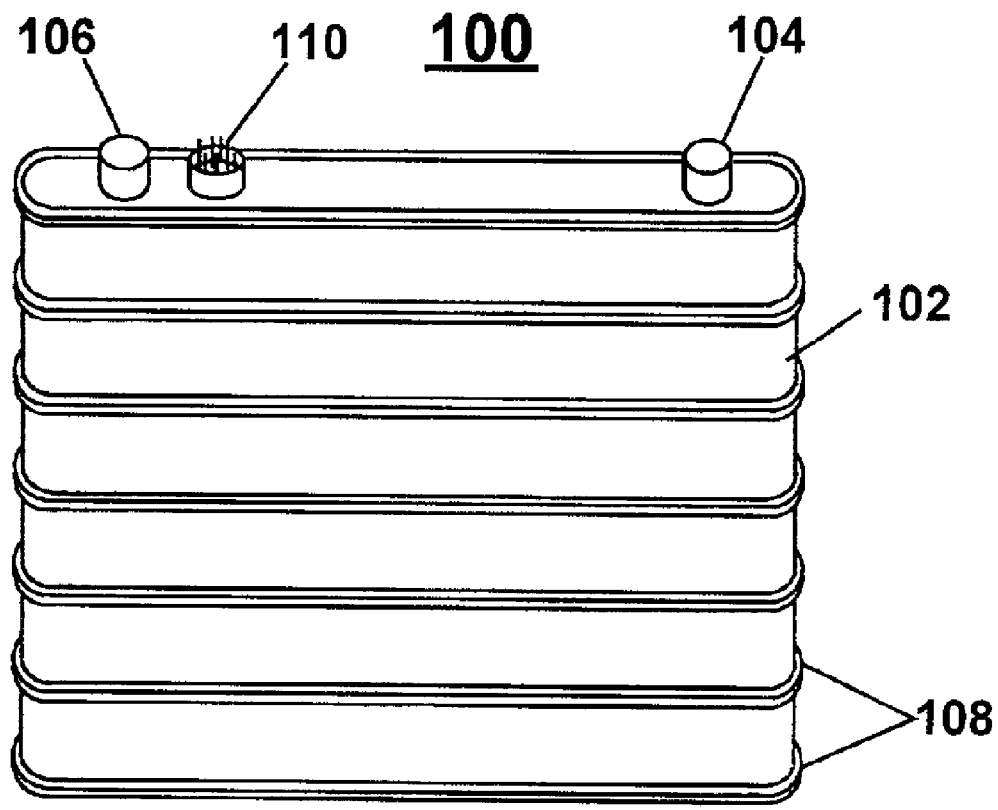
FIG. 1
FIG. 2
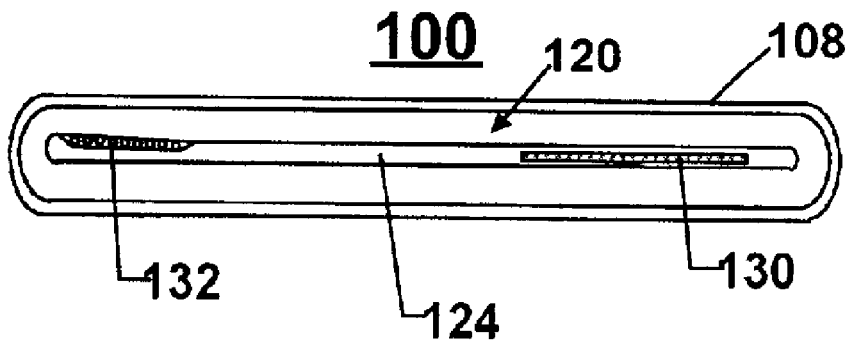

WOUND BIPOLAR LITHIUM POLYMER BATTERIES

CONTRACTUAL ORIGIN OF THE INVENTION

The United States Government has rights in this invention pursuant to Contract No. W-31-109-ENG-38 between the United States Government and Argonne National Laboratory.

1. Field of the Invention

The present invention relates to bipolar batteries and more particularly, to a wound bipolar design for use in bipolar lithium batteries, such as high power lithium polymer batteries.

2. Description of the Related Art

In lithium/metal oxide battery cells, a liquid electrolyte fills the pores in the separator and electrodes, allowing lithium ions to pass between the electrodes, carrying the current, and to interact with active material throughout the electrodes.

In a solid-polymer-electrolyte cell, an electrolyte sheet fills the entire space between the electrodes and the polymer is blended with the electrode material to form a nearly pore-free solid cell. An advantage of this design is that the electrolyte stays in place and will not creep to parts of the cell where it is not desired causing corrosion reactions that shorten cell life. Also, the design of a bipolar battery becomes plausible with a solid electrolyte whereas liquid electrolytes bridge the edges at the periphery of bipolar plates between cells causing rapidly destructive corrosion reactions.

A problem for solid electrolytes is that, until recently, their lithium-ion conductivities have been about two orders of magnitude lower than those of the best liquid electrolytes. Nevertheless, lithium-polymer electrolyte batteries have been under development for many years, notably at Hydro Quebec near Montreal. In that effort, the low conductivity of the electrolyte has been partially offset by employing a metallic lithium electrode, which has very low impedance because it is nonporous and is in direct contact with the electrolyte sheet. These cells are also operated at 60–80° C. to enhance the conductivity of the electrolyte.

A disadvantage of these cells with metallic lithium electrodes is that dendrites form on charging the cells. Initially, this causes a slight loss in coulombic efficiency that gradually becomes more severe as the cell ages and is the main cause of cell failure. Also the cell must be constructed with a positive electrode that is in the charged state to accommodate the lithium in the negative electrode. The best and only practical candidate for the positive active material is vanadium oxide, which is used in the Hydro Quebec cell. This cell has a voltage on discharge that declines rather rapidly with increasing fraction of discharge and averages about 2.6 V. The electrolyte is incompatible with metal-oxides electrodes that operate at higher voltages, most of which are formed in the uncharged state that would not accommodate the metallic negative electrode.

New solid electrolyte materials under development at Argonne have much higher conductivity than previously available materials. They make possible the use of graphite or carbon negative electrodes, which have too high a resistance when their pores are filled with polymer of the types used previously. The new electrolytes are also compatible with metal-oxide positive electrodes operating above 4.0 V versus lithium.

With these new polymer electrolytes, bipolar batteries become plausible. The creeping that liquid electrolytes undergo causing short-circuiting of bipolar cells, is avoided by the use of the polymer electrolyte. The use of graphite or carbon electrodes, made possible by the high conductivities of the new electrode materials, avoids the need for metallic lithium electrodes. The metallic electrodes would be especially impractical for bipolar batteries because of their change in volume on cycling and dendrite formation on charging, which do not occur for the graphite electrodes.

There are several choices of positive electrode materials that are now being used in lithium-ion cells with liquid electrolytes that may be considered for these bipolar polymer electrolyte batteries. These include $LiNiO_2$, $LiCoO_2$, LiMn2O4, various combinations with each other and with $Al_2O_3$, and $TiO_2$. All of these are made in the uncharged state containing the appropriate concentrations of lithium. These positive electrode materials result in a cell voltage of about 3.5 V on discharge at the 1-h rate for the thin electrodes commonly used in lithium-ion cells with graphite negative electrodes.

A problem in the design of bipolar batteries for the lithium-ion system, or any other system that requires external means of state of charge equalization for the cells, is that some mechanism must be found to connect leads to each individual cell. These leads need only carry a fraction of an ampere of current and thus can be attached at the edges of the bipolar plates.

A problem in the design of batteries for hybrid vehicles is that the current and voltage must be very high for a battery of low capacity. A similar problem exists for the 42-volt starting, lighting, and ignition (SLI) batteries that have been proposed for future conventional vehicles. Thus, large terminals, capable of high current, are required for many comparatively small cells. The containers for these cells must be hermetically sealed for a lithium battery to protect the lithium from the atmosphere. As a result, the cost of the cell containers and feedthroughs is a major cost of the battery in current designs.

It is an object of the invention to provide a new design arrangement for high power lithium polymer batteries.

It is another object of the invention to provide an improved high power lithium polymer battery to meet the battery requirements for a hybrid electric vehicle.

It is another object of the invention to provide an improved high power lithium polymer battery that reduces the number of containers and feedthroughs and, thus, reduces the battery cost.

It is another object of the invention to provide an improved high power bipolar battery including multiple cell assemblies connected in series to form the high power bipolar battery.

It is another object of the invention to provide a low-cost method for attaching suitable leads to individual cells in a bipolar battery for the purpose of connection to a state of charge control system.

It is another object of the invention to provide an improved high power lithium polymer battery substantially without negative effect and that overcome many of the disadvantages of prior arrangements.

As used in the description and claims, the term high power battery should be understood to include various battery power levels as required for a particular application.

SUMMARY OF THE INVENTION

In brief, a high power bipolar battery, such as a high power lithium polymer battery is provided. The bipolar battery includes a plurality of multiple cell assemblies. The plurality of multiple cell assemblies is connected in series to form the high power bipolar battery. Each of the plurality of multiple cell assemblies includes a rigid core with a bipolar cell stack of multiple cells wound together around the rigid core to produce a large active cell area. The wound bipolar cell stack includes a positive battery connection and a negative battery connection. A container surrounds the bipolar cell stack. A positive terminal carried by the container is connected to the positive battery connection. A negative terminal carried by the container is spaced apart from the positive terminal and connected to the negative battery connection. A state-of-charge connector carried by the container is spaced apart from the positive and negative terminals. The state-of-charge connector include multiple conductors, each connected to a respective one of the multiple cells.

BRIEF DESCRIPTION OF THE DRAWINGS

The present invention together with the above and other objects and advantages may best be understood from the following detailed description of the preferred embodiments of the invention illustrated in the drawings, wherein:

FIG. 1 is a perspective view illustrating a lithium polymer bipolar wound stack assembly in accordance with the preferred embodiment;

FIG. 2 provides a simplified cross sectional view of the lithium polymer bipolar stack assembly of FIG. 1 in accordance with the preferred embodiment;

DETAILED DESCRIPTION OF THE PREFERRED EMBODIMENTS

Figure 3A:
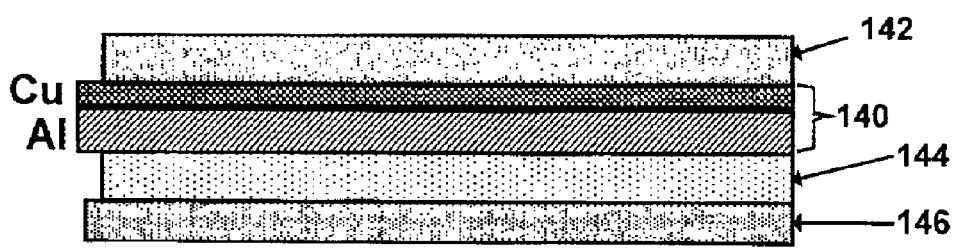
FIG. 3A illustrates a lithium polymer cell connection assembly in accordance with the preferred embodiment.

In accordance with features of the invention, a lithium polymer bipolar high power battery is provided that is appropriate for applications requiring high voltage, high power, and limited capacity. Even with the new electrolytes the area-specific impedance is expected to be 50 to 75 ohm-cm$^2$ at 20° C., two or three times higher than for cells with liquid electrolytes. Therefore, the cells must have a large area even though the capacity is limited. In accordance with features of the invention, the large cell area is accomplished by making many wrappings of thin cell layers around a core.

Having reference now to the drawings, in FIGS. 1, 2, 3A, 3B, 3C and 3E, there is shown an exemplary lithium polymer bipolar stack assembly generally designated as 100 in accordance with the preferred embodiment. The illustrated lithium polymer bipolar stack assembly 100 includes an eight cell arrangement; however, it should be understood that the present invention is not limited to the illustrated eight cell arrangement. In accordance with features of the invention, a selected number, such as between three through fifteen, thin cells are arranged in series in a bipolar configuration by simultaneously winding many appropriately ordered layers of material around a supporting core in an elliptical cylindrical shape to form the lithium polymer bipolar stack assembly 100 for a particular application.

As shown in FIG. 1, the wound stack assembly 100 includes a stainless steel container 102. A positive terminal 104 and a negative terminal 106 are located near opposite sides at the top of the stainless steel container 102. A plurality of elastomer bands 108 is provided around the stack container 102. A multiple pin state-of-charge connector 110, such as a 7-pin connector for the eight cell, is located near the negative terminal 106 at the top of the stainless steel container 102.

Referring to FIG. 2, a bipolar cell stack generally designated as 120 is formed by a plurality of thin lithium polymer cells wound together around a flat core 124 to produce a multiple-cell battery having a large active area. Positive current collection is taken out from one side of the stacked cells by a positive connection of the stack 120 and negative collection is taken out from the opposite side of the stacked cells by a negative cell stack connection. Only three feedthroughs are required for the terminals 104, 106 and connector 110 that is used for state-of-charge equalization of the cells.

FIGS. 3A, 3B, 3C, and 3E illustrate connection assemblies for connecting bipolar cell plates, and positive and negative end-plates anchored to the rigid polymer battery core 124. A cell connection assembly 122 is illustrated and described with respect to FIG. 3A. The current flows from a positive plate connection assembly 126, as illustrated and described with respect to FIG. 3B, through the cells to a negative plate connection assembly 128 as illustrated and described with respect to FIG. 3C. FIG. 3D illustrates a three-cell stack generally designated as 130 in accordance with the preferred embodiment.

The entire stack 120 is hermetically sealed, rather than each cell as in conventional lithium batteries. A positive conductor 132 and a plurality of state of charge conductors 134 are shown within the battery core 124 in FIG. 2. In an eight cell stack 120, seven conductors or wires 134 connecting to bipolar plates separating the eight cells are connected to the 7-pin state-of-charge connector 110.

Referring to FIG. 3A, lithium polymer bipolar plate assembly 122 includes a composite foil 140 of copper on aluminum, coated on the copper side by a negative electrode material 142 and coated on the aluminum side by a positive electrode material 144 that is covered with an electrolyte sheet 146.

Figure 3B:
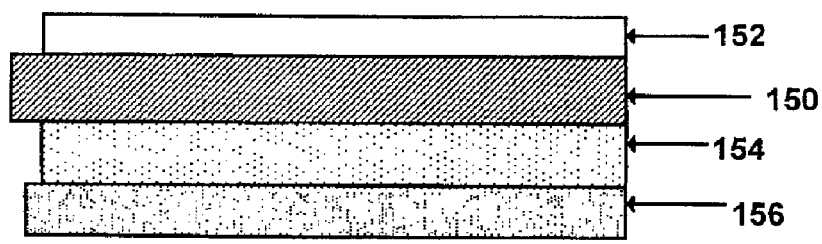
FIG. 3B illustrates a positive end-plate connection assembly in accordance with the preferred embodiment.

Referring to FIG. 3B, the positive end-plate assembly 126 includes an aluminum foil 150 coated on one side with an insulating polymer sheet 152 and coated on the opposite side with positive electrode material 154 that is covered with an electrolyte sheet 156.

Figure 3C:
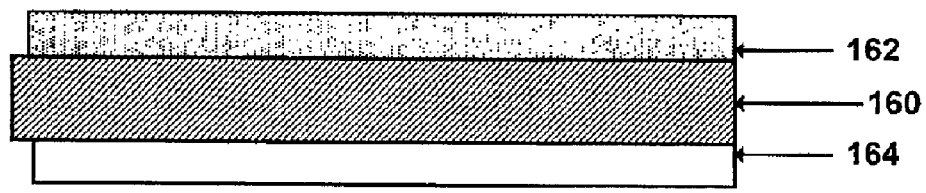
FIG. 3C illustrates a negative end-plate connection assembly in accordance with the preferred embodiment.
Figure 3D:
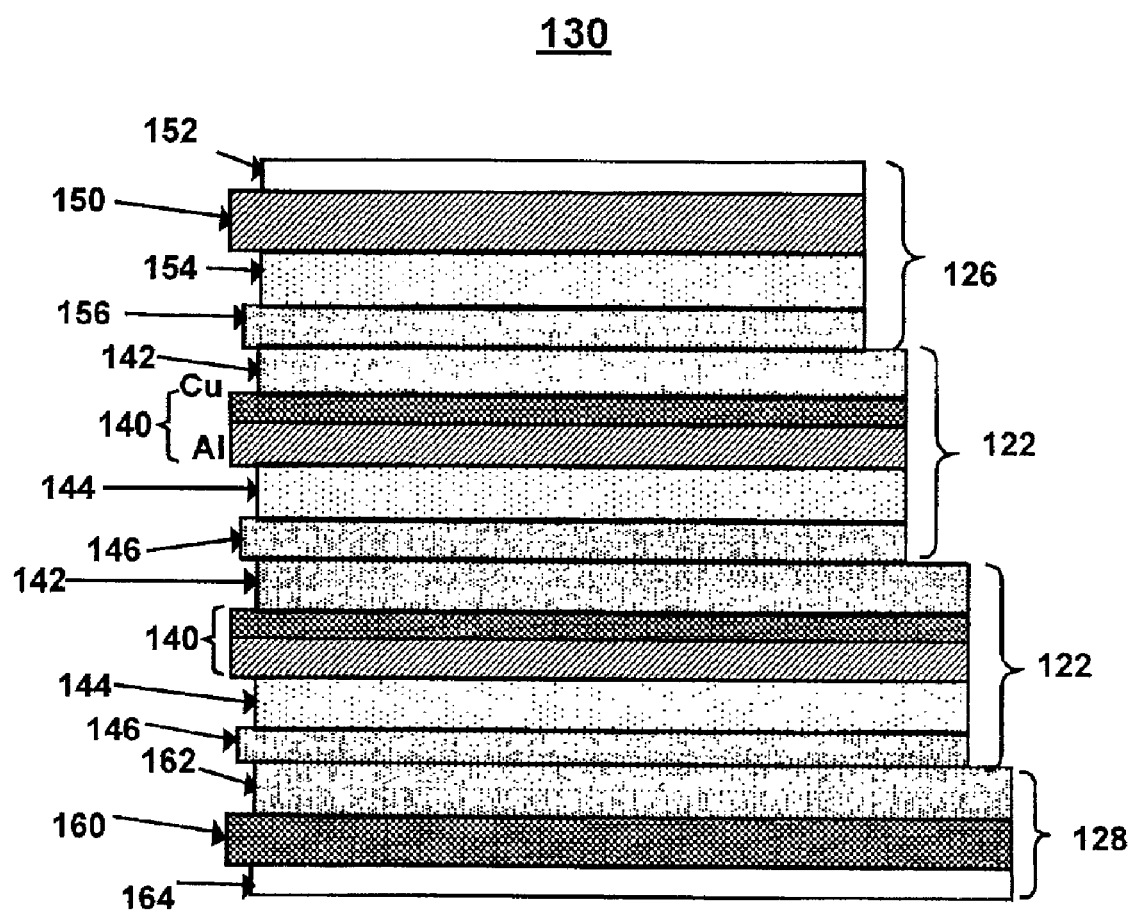
FIG. 3D illustrates a three-cell stack in accordance with the preferred embodiment.

Referring to FIG. 3C, the negative end-plate assembly 128 includes a copper foil 160 coated on one side with negative electrode material 162 and coated on the opposite side with an insulating polymer sheet 164.

Referring to FIG. 3D, there is shown the three-cell stack 130. A stack of N cells contains one positive end-plate assembly 126, one negative end-plate assembly 128, and N-1 bipolar plate assemblies 122. The three-cell stack 130 contains one positive end-plate assembly 126, one negative end-plate assembly 128, and two bipolar plate assemblies 122. The assemblies 122, 126 and 128 are simultaneously wrapped around the core 124 as separate entities. On discharge, the current flow is perpendicular to the stack layers from the negative end plate to the positive end plate and then through an external circuit (not shown) from the positive terminal to the negative terminal.

Figure 3E:
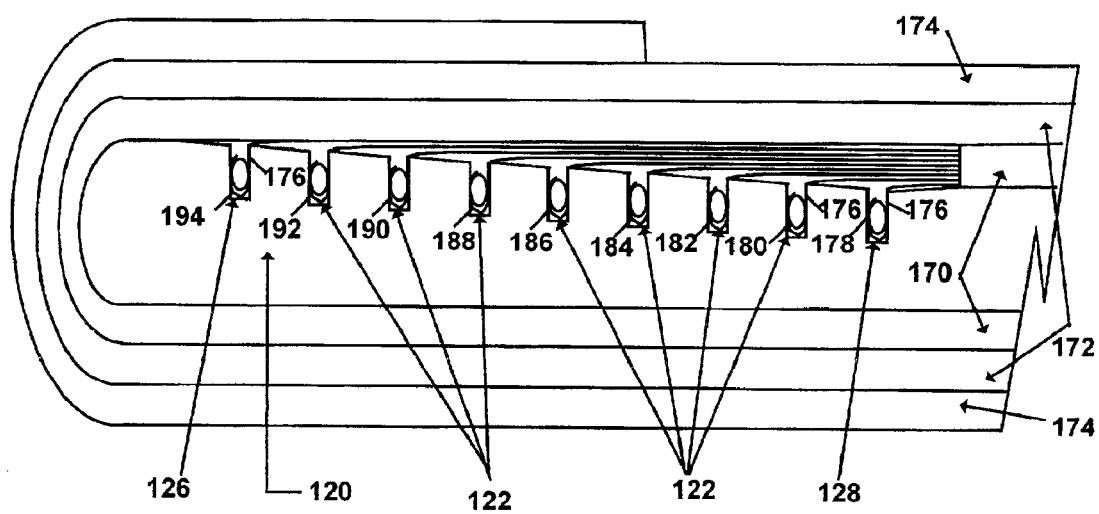
FIG. 3E illustrates a first three wrappings around a polymer battery core of the lithium polymer, 8-cell bipolar stack assembly of FIG. 1 in accordance with the preferred embodiment.

Referring to FIG. 3E, there is shown a first three wrappings 170, 172, 174 around the rigid polymer battery core 124 forming the bipolar cell stack 120 of the lithium polymer bipolar stack assembly 100. In the lithium polymer bipolar stack assembly 100, the positive end-plate connection assembly 126, seven bipolar plate assemblies 122, and the negative endplate assembly 128 are prefabricated assemblies of sheet materials that are used in winding the battery 100. A copper conductor or wire 178 that serves as a lead for equalizing the state of charge of the first cell anchors the negative endplate assembly 128 to a groove 176 in the ridged polymer core 124. Each of the cell assemblies 122 and the positive end-plate assembly 126 are fastened to the core 124 in a respective grove 176. A respective conductor 180, 182, 184, 186, 188, 190, and 192 serves as a lead for the state of charge of the second through eight cells anchoring respective seven cell assemblies 122. A conductor 194 similarly anchors the positive endplate assembly 126. All of the layers in an eight-cell battery form a stack about 0.9 mm thick. This stack is wrapped around the core 124, for example, 12 times in the illustrated application, resulting in a battery stack winding that is about 25-mm thick and with an area of about 12,000 cm$^2$ for each cell. On discharge, the current flows from the negative end-plate 128 through the stack 120 to the positive end-plate 126.

Current may be collected from the end-plate assemblies 126, 128 and brought to the terminals 104, 106 by various arrangements. One connection approach is to extend the negative cell end plates about 10 mm beyond the top end of the cells, pinch these layers together and weld them to an attachment to the negative terminal 106. Similarly, the positive end plates can be welded to an attachment to the aluminum conductor 132 within the core 120 around which the stack is wound, and the conductor 132 can be welded to the positive terminal 104 at the top of the stainless steel container 102. The wires 180, 182, 184, 186, 188, 190, 192 connecting to respective bipolar plates separating the eight cells can be brought out through the stack container 102 to the state-of-charge connector 110 as shown in FIGS. 1 and 2. Alternatively, an electronic state-of-charge control device can be located within the container 102.

Figure 4:
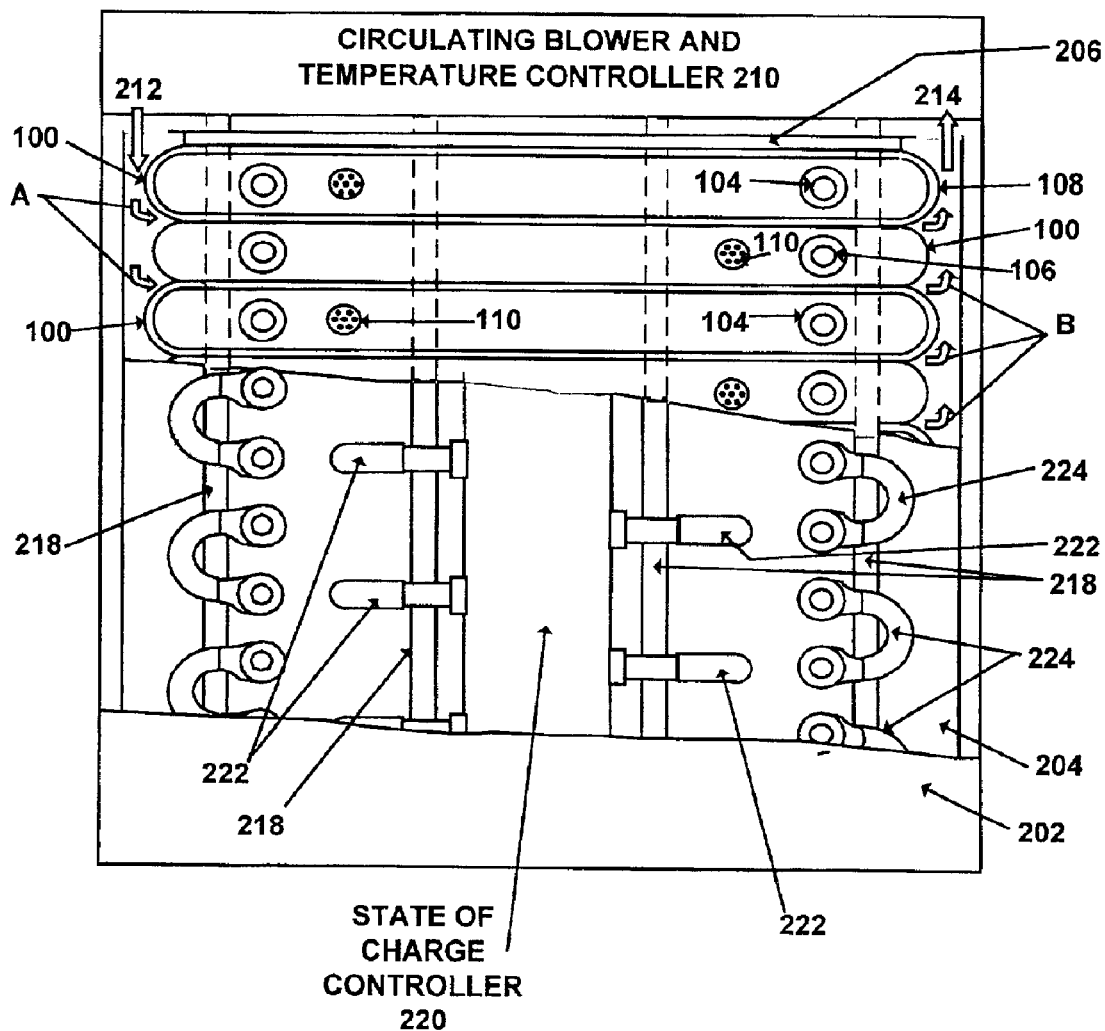
FIG. 4 is an elevational view illustrating a lithium polymer bipolar high power battery in accordance with the preferred embodiment.

Referring to FIG. 4, there is shown an exemplary lithium polymer bipolar high power battery 200 generally designated as 200 in accordance with the preferred embodiment. The lithium polymer bipolar high power battery 200 includes, for example, ten stack assemblies 100 each including eight cells, as shown in FIGS. 1 and 2. The ten stack assemblies 100 are connected in series to form the battery 200 that includes eighty cells that provide about 280 volts potential. By the arrangement in accordance with the invention, the number of containers is reduced from eighty containers with each cell in a container for a conventional design, to ten containers 102 for lithium polymer bipolar high power battery 200.

It should be understood that a single stack could form the entire battery such as a twelve-cell stack for a 42-volt SLI battery. Also, various arrangements of the stack assemblies 100 can be combined in series to form bipolar high power batteries. For example, fourteen seven-cell stacks 100 can be connected in series to form a battery of ninety eight cells providing about 350 volts potential. By this arrangement, the number of containers is reduced from ninety eight, which would be needed for a conventional design, to fourteen stack containers 100.

Lithium polymer bipolar high power battery 200 includes an insulated battery enclosure 202 surrounding the plurality of the lithium polymer bipolar stack assemblies 100 and an insulating board 204 located above the stacks 100. In FIG. 4, the battery enclosure 202 and insulating board 204 are shown broken away to illustrate interior details of the battery 200. Lithium polymer bipolar high power battery 200 includes a compression plate generally designated as 206 extending over the multiple stack assemblies 100.

Lithium polymer bipolar high power battery 200 includes a circulating blower and temperature controller 210 providing a cooling air flow to the battery 200. An inlet 212 and an outlet 214 are provided within the battery 200 coupled to the circulating blower and temperature controller 210. The battery 200 is cooled by air flowing between each stack 100 as indicated by arrows labeled A and B. However, it is also necessary to provide pressure across the cell layers and this is done by a plurality of compression bands 218, such as steel straps that are tightly wrapped on the insulating board 204 across the stacks 100 around the length of the battery 200.

Multiple standoffs or elastomer bands 108 as shown in FIGS. 1 and 2 are provided around alternate stacks 100 as shown in FIG. 4 to maintain space for airflow and provide spring action to maintain the pressure. It should be understood that various arrangements can be used to provide the function of the standoffs 108. For example, a one-piece steel spring structure (not shown) can be inserted between adjacent stacks 100 to maintain space for airflow and provide spring action to maintain the pressure.

Lithium polymer bipolar high power battery 200 includes a state-of-charge controller 220 connected to each of the stack assemblies 100 for state-of-charge equalization for each single cell of the stack 120. A plurality of cables 222 including multiple conductors (not shown) connect the state-of-charge controller 220 to the respective multiple pin state-of-charge connector 110 of each stack assembly 100. Lithium polymer bipolar high power battery 200 includes a plurality of module connectors 224 connecting adjacent positive and negative terminals 104, 106 of adjacent stack assemblies 100 to connect all the stack assemblies 100 in series.

While the present invention has been described with reference to the details of the embodiments of the invention shown in the drawing, these details are not intended to limit the scope of the invention as claimed in the appended claims.

What is claimed is:

1. A high power bipolar battery comprising:
   a plurality of multiple cell assemblies, said plurality of multiple cell assemblies connected in series to form the high power bipolar battery; each of said plurality of multiple cell assemblies including
   a rigid core;
   a bipolar cell stack of multiple cells wound together around said rigid core to produce an active cell area; said wound bipolar cell stack including a positive battery connection and a negative battery connection;
   a container surrounding said bipolar cell stack;
   a positive terminal carried by said container connected to said positive battery connection;
   a negative terminal carried by said container spaced apart from said positive terminal and connected to said negative battery connection;

a state-of-charge connector carried by said container spaced apart from said positive and negative terminals; said state-of-charge connector including multiple conductors, each connected to a respective one of said multiple cells;

a plurality of standoffs, each disposed between adjacent ones of said plurality of multiple cell assemblies; and a circulating blower and temperature controller for providing cooling air flow between said plurality of multiple cell assemblies.

2. A high power bipolar battery as recited in claim 1 wherein said bipolar cell stack of multiple cells wound together around said rigid core to produce an active cell area include said bipolar cell stack of multiple cells of bipolar lithium polymer cells wound together around said rigid core to produce an active cell area having a generally elliptical cylindrical shape.

3. A high power bipolar battery as recited in claim 1 includes a positive end-plate assembly mounted to said rigid core for providing said positive battery connection.

4. A high power bipolar battery as recited in claim 1 includes a negative end-plate assembly mounted to said rigid core for providing said negative battery connection.

5. A high power bipolar battery as recited in claim 1 wherein said container surrounding said bipolar cell stack is a stainless steel container.

6. A high power bipolar battery as recited in claim 1 wherein said rigid core is a rigid polymer core.

7. A high power bipolar battery as recited in claim 1 includes an insulated housing containing said plurality of multiple cell assemblies.

8. A high power bipolar battery as recited in claim 1 includes a plurality of compression bands providing pressure across said plurality of multiple cell assemblies.

9. A high power bipolar battery comprising:

a plurality of multiple cell assemblies, said plurality of multiple cell assemblies connected in series to form the high power bipolar battery; each of said plurality of multiple cell assemblies including a rigid core;

a bipolar cell stack of multiple cells wound together around said rigid core to produce an active cell area; said wound bipolar cell stack including a positive battery connection and a negative battery connection;

a container surrounding said bipolar cell stack;

a positive terminal carried by said container connected to said positive battery connection;

a negative terminal carried by said container spaced apart from said positive terminal and connected to said negative battery connection;

a state-of-charge connector carried by said container spaced apart from said positive and negative terminals; said state-of-charge connector including multiple conductors, each connected to a respective one of said multiple cells;

a state-of-charge controller; and a plurality of cables connected between said state-of-charge controller and said state-of-charge connector of each of said plurality of multiple cell assemblies.

10. A high power bipolar battery as recited in claim 9 includes a plurality of bipolar plate assemblies, each mounted to said rigid core and providing a respective state-of-charge connection to said multiple cells.

11. A high power bipolar battery as recited in claim 9 wherein each of said plurality of multiple cell assemblies include said bipolar cell stack having a selected number of cells wound together around said rigid core; said selected number in a range between three and fifteen cells.

12. A high power bipolar battery as recited in claim 9 includes a plurality of module connectors, each connecting adjacent said positive terminal and negative terminals of adjacent stack assemblies.

* * * * *